United States Patent
Ogata et al.

(10) Patent No.: US 9,813,188 B2
(45) Date of Patent: Nov. 7, 2017

(54) TRANSMITTING CIRCUIT, COMMUNICATION SYSTEM, AND COMMUNICATION METHOD

(71) Applicant: FUJITSU LIMITED, Kawasaki-shi, Kanagawa (JP)

(72) Inventors: Yuuki Ogata, Kawasaki (JP); Yoichi Koyanagi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 427 days.

(21) Appl. No.: 14/318,392

(22) Filed: Jun. 27, 2014

(65) Prior Publication Data

US 2015/0029876 A1  Jan. 29, 2015

(30) Foreign Application Priority Data

Jul. 26, 2013 (JP) .................................. 2013-155549

(51) Int. Cl.
| | | |
|---|---|---|
| *H04L 1/00* | (2006.01) | |
| *H04J 3/04* | (2006.01) | |
| *H04L 25/02* | (2006.01) | |
| *H04L 25/03* | (2006.01) | |

(52) U.S. Cl.
CPC ............ *H04L 1/0002* (2013.01); *H04J 3/047* (2013.01); *H04L 25/028* (2013.01); *H04L 25/03146* (2013.01)

(58) Field of Classification Search
CPC ............................... H04J 3/047; H04L 1/0002
USPC .......................... 370/233, 532, 916; 375/233
See application file for complete search history.

(56) References Cited

U.S. PATENT DOCUMENTS

| | | | | |
|---|---|---|---|---|
| 7,065,136 B1* | 6/2006 | Porter | ............... | H04L 25/03006 375/232 |
| 7,888,966 B1* | 2/2011 | Davidson | ............. | G11C 7/1066 326/62 |
| 8,537,886 B1* | 9/2013 | Su | ..................... | H04L 25/03057 375/233 |
| 8,773,175 B2* | 7/2014 | Shon | ..................... | H03H 11/26 326/30 |
| 2008/0158035 A1* | 7/2008 | Makabe | ................... | G06F 1/06 341/155 |

(Continued)

FOREIGN PATENT DOCUMENTS

| | | |
|---|---|---|
| JP | 62-198226 A | 9/1987 |
| JP | 7-193511 A | 7/1995 |
| JP | 4723029 B2 | 7/2011 |

*Primary Examiner* — Melvin Marcelo
*Assistant Examiner* — Natali N Pascual Peguero
(74) *Attorney, Agent, or Firm* — Arent Fox LLP

(57) ABSTRACT

A transmitting circuit includes: a multiplexer configured to output a third digital signal obtained by alternately synthesizing a first digital signal of a predetermined cycle length and a predetermined data rate with a second digital signal of the predetermined cycle length and the predetermined data rate; a first selector configured to output the first digital signal in a first state and output the third digital signal in a second state that is different from the first state; a second selector configured to output the second digital signal in the first state and output the third digital signal in the second state; a first driver circuit configured to output a signal corresponding to a signal output from the first selector; and a second driver circuit configured to output a signal corresponding to a signal output from the second selector.

5 Claims, 12 Drawing Sheets

(56) References Cited

U.S. PATENT DOCUMENTS

2009/0309771 A1\* 12/2009 Yamaguchi ............ H03M 9/00
                                                                        341/101

\* cited by examiner

TRANSMITTING CIRCUIT, COMMUNICATION SYSTEM, AND COMMUNICATION METHOD

CROSS-REFERENCE TO RELATED APPLICATION

This application is based upon and claims the benefit of priority of the prior Japanese Patent Application No. 2013-155549 filed on Jul. 26, 2013, the entire contents of which are incorporated herein by reference.

FIELD

The embodiments discussed herein are related to a transmitting circuit, a communication system, and a communication method.

BACKGROUND

For the Ethernet (registered trademark) standards and the like, a data rate has been increased from a rate of 10 gigabits per second to a rate of 25 gigabits per second. With the increase, a data rate of a serial data transmitting circuit included in a so-called SERializer/DESerializer (SerDes) and a data rate of a serial data transmitting circuit have been increased to a rate of 25 gigabits per second.

A conventional serial data transmitting circuit is described with reference to FIGS. 1A and 1B. FIG. 1A is a diagram illustrating the conventional serial data transmitting circuit 8. FIG. 1B is a timing chart of the serial data transmitting circuit 8.

The serial data transmitting circuit 8 that outputs, as a serial signal, four digital signals input in parallel includes a ½ frequency divider 110, first to third 2:1 multiplexers 120 to 122, and a driver circuit 130. If a signal to be output is driven at a rate of 25 gigabits per second, a clock signal CK with a frequency of 12.5 GHz that corresponds to a waveform PA illustrated in FIG. 1B is provided to the ½ frequency divider 110 and the third 2:1 multiplexer 122. The ½ frequency divider 110 divides the frequency of the provided clock signal CK by 2 and provides, to each of the 2:1 multiplexers 120 and 121, a frequency-divided signal having a frequency of 6.25 GHz and corresponding to a waveform PB illustrated in FIG. 1B. The first 2:1 multiplexer 120 outputs any of first and third input digital signals $D_{in0}$ and $D_{in2}$ based on the frequency-divided signal provided from the ½ frequency divider 110. The digital signal output from the first 2:1 multiplexer 120 corresponds to a waveform PC illustrated in FIG. 1B. In addition, the second 2:1 multiplexer 121 outputs any of second and fourth input digital signals $D_{in1}$ and $D_{in3}$ based on the frequency-divided signal provided from the ½ frequency divider 110. The digital signal output from the second 2:1 multiplexer 121 corresponds to a waveform PD illustrated in FIG. 1B. Furthermore, the third 2:1 multiplexer 122 outputs a digital signal output from the first or second 2:1 multiplexer 120 or 121 at a clock frequency of 12.5 GHz in the serial data transmitting circuit 8 illustrated in FIG. 1A. The digital signal output from the third 2:1 multiplexer 122 corresponds to a waveform PE illustrated in FIG. 1B. The signal $V_{out}$ output from the third 2:1 multiplexer 122 is transmitted through the driver circuit 130 to a transmission path.

In the serial data transmitting circuit 8 illustrated in FIG. 1A, the ½ frequency divider 110, the third 2:1 multiplexer 122, and the driver circuit 130 that are surrounded by a broken line represented by an arrow A operate at the high frequency of 12.5 GHz. Data rates are expected to be increased in the future. It, however, tends to become difficult to increase data rates of elements such as a transistor included in a serial data transmitting circuit. It, therefore, tends to difficult to design a serial data transmitting circuit that supports such a high data rate. With increases in data rates, power to be consumed increases. In order to reduce power to be consumed, the number of elements that operate at high speeds is requested to be reduced.

In addition, if a low-power-consumption serial data transmitting circuit is used, it is preferable that the serial data transmitting circuit be compatible with a conventional serial data transmitting circuit.

The following is a reference document.
[Document 1] Japanese Patent No. 4723029.

SUMMARY

According to an aspect of the invention, a transmitting circuit includes: a multiplexer configured to output a third digital signal obtained by alternately synthesizing a first digital signal of a predetermined cycle length and a predetermined data rate with a second digital signal, shifted by a half of the predetermined cycle length from the first digital signal, of the predetermined cycle length and the predetermined data rate so as to ensure that a data rate of the third digital signal is twice as high as the data rate of the first digital signal; a first selector configured to output the first digital signal in a first state and output the third digital signal in a second state that is different from the first state; a second selector configured to output the second digital signal in the first state and output the third digital signal in the second state; a first driver circuit configured to output a signal corresponding to a signal output from the first selector; and a second driver circuit connected to the first driver through outputs of the first and second driver circuits and configured to output a signal corresponding to a signal output from the second selector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a transmitting circuit according to an embodiment and a communication system according to the embodiment are described with reference to FIGS. 2A to 12. First, a related serial data transmitting circuit 9 is described with reference to FIGS. 2A to 5.

Figure 2A:
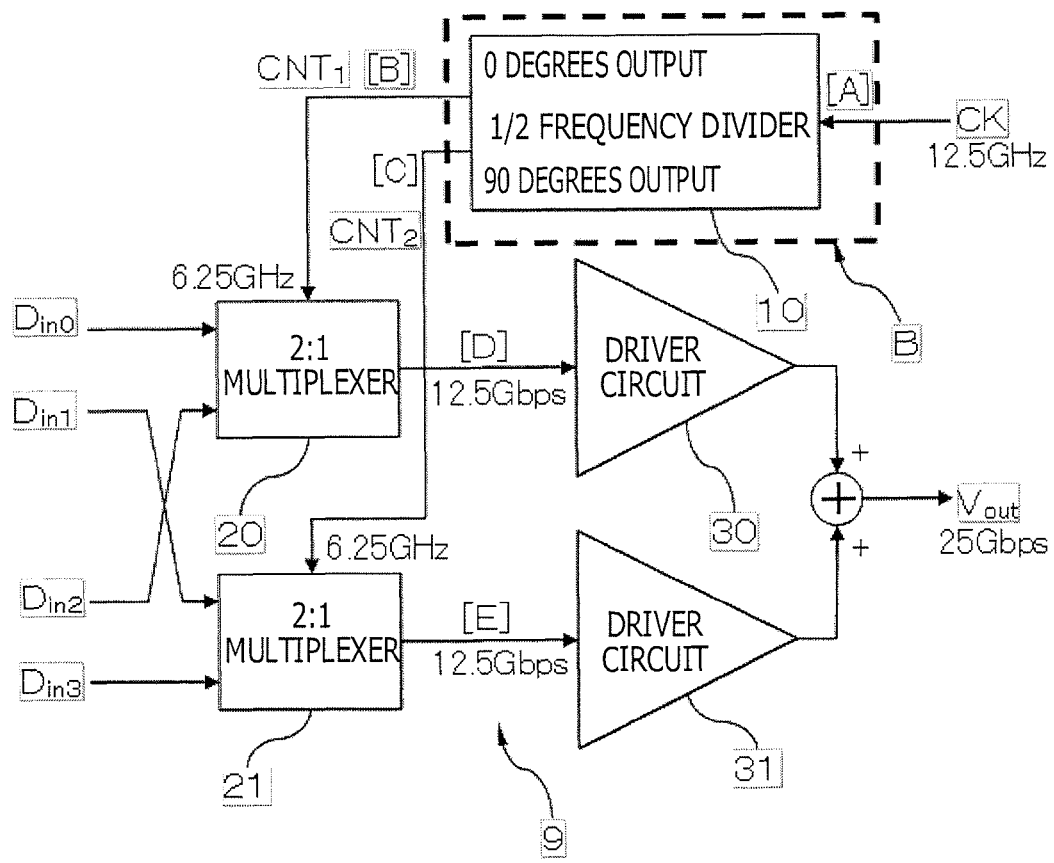
FIG. 2A is a diagram illustrating a related serial data transmitting circuit.

FIG. 2A is a block diagram illustrating the serial data transmitting circuit 9.

The serial data transmitting circuit 9 includes a ½ frequency divider 10, first and second 2:1 multiplexers 20 and 21, and first and second driver circuits 30 and 31. The serial data transmitting circuit 9 outputs, as a serial digital signal, four digital signals input in parallel.

Figure 3:
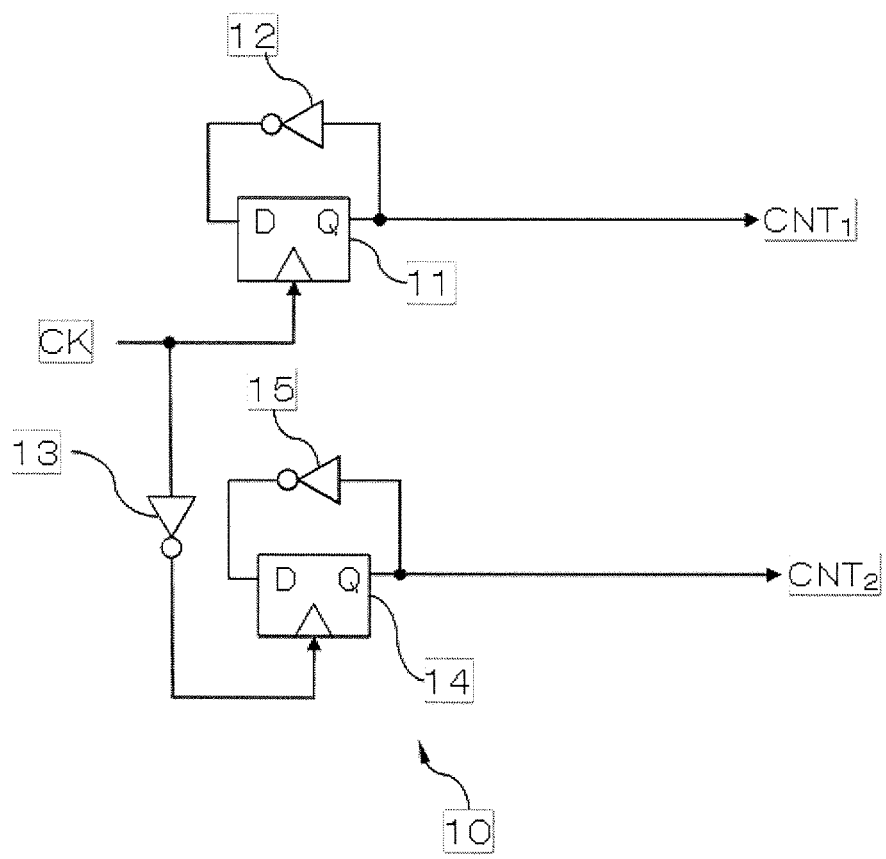
FIG. 3 is an internal circuit diagram illustrating a frequency divider included in the serial data transmitting circuit illustrated in FIG. 2A.

FIG. 3 is an internal circuit diagram illustrating the internal ½ frequency divider 10.

The ½ frequency divider 10 includes D flip-flops 11 and 14 and inverters 12 and 13. The D flip-flop 11 outputs a signal from an output terminal Q, and the signal is input to an input terminal D of the D flip-flop 11 through the inverter 12. Thus, the D flip-flop 11 outputs an inverted signal at each of the times of rising edges of a clock signal CK and thereby outputs a first control signal $CNT_1$ of which a cycle is twice as long as the clock signal CK. The signal output from the output terminal Q of the D flip-flop 11 is input to an input terminal D of the D flip-flop 14. An inverted signal of the clock signal CK is input to a clock terminal of the D flip-flop 14 through the inverter 13. Thus, the D flip-flop 14 outputs the signal $CNT_1$ synchronized with falling edges of the clock signal CK and thereby outputs a second control signal $CNT_2$ of which a cycle is twice as long as the clock signal CK. A phase difference between the second control signal $CNT_2$ and the first control signal $CNT_1$ corresponds to a half of a cycle of the clock signal CK.

The ½ frequency divider 10 receives the clock signal CK and outputs the first and second control signals $CNT_1$ and $CNT_2$ with a frequency obtained by dividing the frequency of the clock signal by 2. The second control signal $CNT_2$ is different in phase from the first control signal $CNT_1$, while the phase difference corresponds to a half of the cycle of the clock signal CK. Specifically, the second control signal $CNT_2$ is delayed with respect to the first control signal $CNT_1$, while the delay is equal to a half of the cycle of the clock signal CK.

Figure 4:
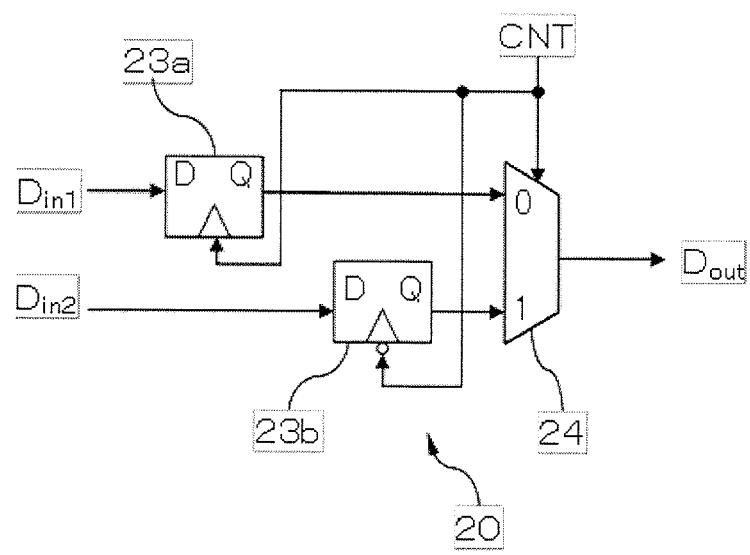
FIG. 4 is an internal circuit diagram illustrating a 2:1 multiplexer included in the serial data transmitting circuit illustrated in FIG. 2A.

FIG. 4 is an internal circuit diagram illustrating the first 2:1 multiplexer 20. Although the first 2:1 multiplexer 20 is described below, the second 2:1 multiplexer 21 has the same configuration as the first 2:1 multiplexer 20.

The first 2:1 multiplexer 20 includes D flip-flops 23a and 23b and a multiplexer 24. The D flip-flop 23a latches a digital signal input to an input terminal D of the D flip-flop 23a at the times of rising edges of a control signal CNT input to a clock terminal of the D flip-flop 23a and outputs the digital signal from an output signal Q of the D flip-flop 23a. The D flip-flop 23b latches a digital signal input to an input terminal D of the D flip-flop 23b at the times of falling edges of the control signal CNT input to a clock terminal of the D flip-flop 23b and output the digital signal from an output terminal Q of the D flip-flop 23b. When the control signal CNT represents 0, the multiplexer 24 outputs, as an output signal $D_{out}$, the signal output from the output terminal Q of the D flip-flop 23a. When the control signal CNT represents 1, the multiplexer 24 outputs, as the output signal $D_{out}$, the signal output from the output terminal Q of the D flip-flop 23b.

The first 2:1 multiplexer 20 selectively outputs, based on the first control signal $CNT_1$, a signal corresponding to any of the first and third digital signal $D_{in0}$ or $D_{in2}$ input in parallel. The second 2:1 multiplexer 21 selectively outputs, based on the second control signal $CNT_2$, a signal corresponding to any of the second and fourth digital signal $D_{in1}$ or $D_{in3}$ input in parallel.

Figure 5:
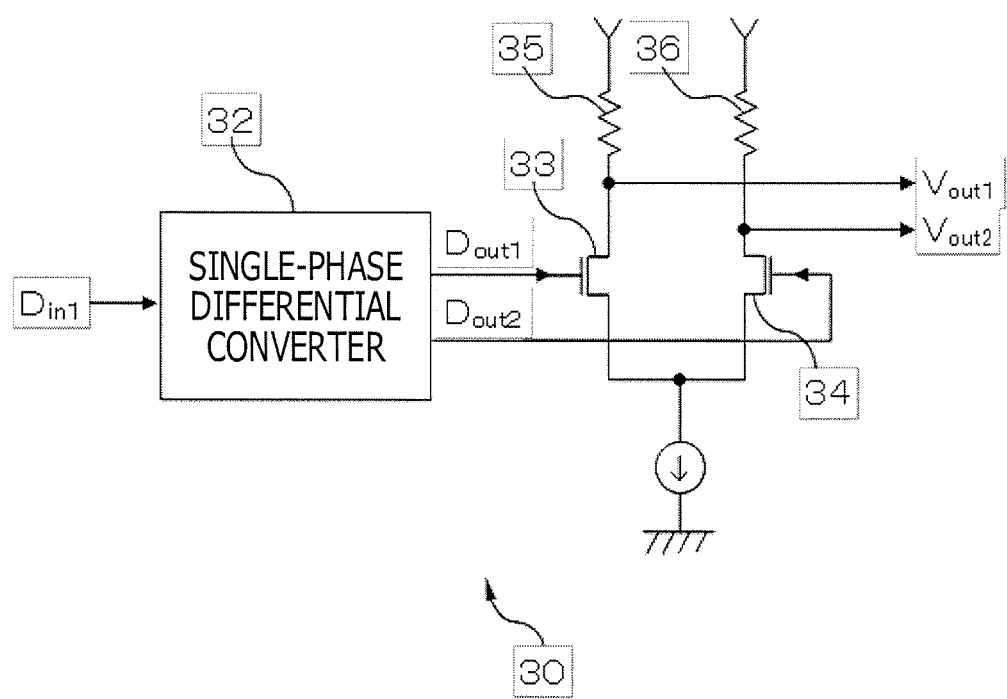
FIG. 5 is an internal circuit diagram illustrating a driver circuit included in the serial data transmitting circuit illustrated in FIG. 2A.

FIG. 5 is an internal circuit diagram illustrating the first driver circuit 30. Although the first driver circuit 30 is described below, the second driver circuit 31 has the same configuration as the first driver circuit 30.

The first driver circuit 30 includes a single-phase differential converter 32, first and second transistors 33 and 34, and first and second resistors 35 and 36. The single-phase differential converter 32 converts the input digital signal $D_{in1}$ into first and second differential output signals $D_{out1}$ and $D_{out2}$. The first and second transistors 33 and 34 are nMOS transistors. The first and second transistors 33 and 34 output analog signals $V_{out1}$ and $V_{out2}$ based on the digital signals $D_{out1}$ and $D_{out2}$ input to gate terminals of the first and second transistors 33 and 34, respectively. The first and second resistors 35 and 36 are terminating resistors with resistance of 50Ω.

The first driver circuit 30 outputs, as an analog signal, the digital signal output from the first 2:1 multiplexer 20. The second driver circuit 31 outputs, as an analog signal, the digital signal output from the second 2:1 multiplexer 21. Outputs of the first and second driver circuits 30 and 31 are connected to each other. Thus, an output signal $V_{out}$ is a signal obtained by synthesizing the analog signal output from the first driver circuit 30 with the analog signal output from the second driver circuit 31.

Figure 2B:
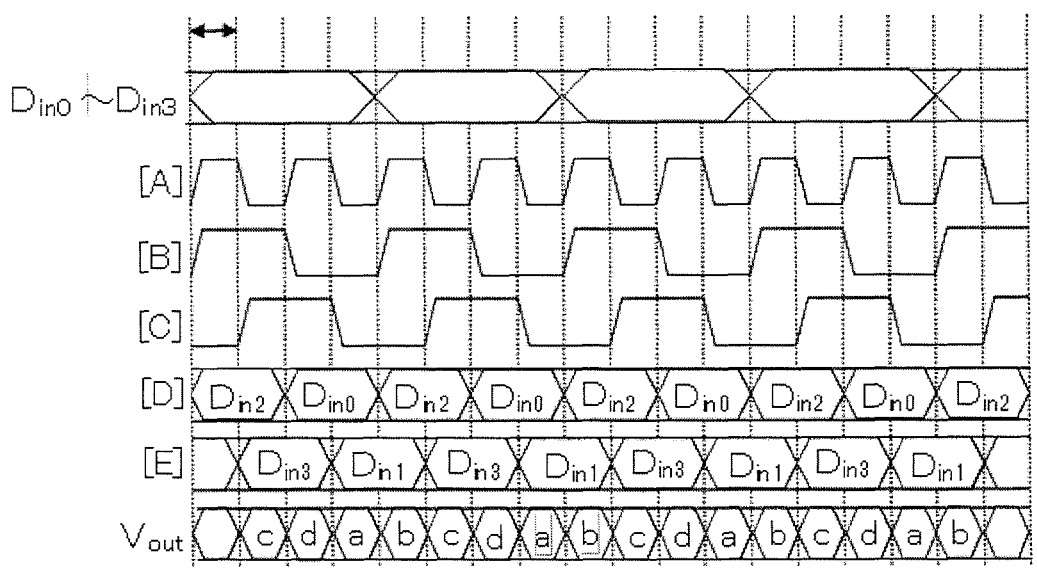
FIG. 2B is a timing chart of the serial data transmitting circuit illustrated in FIG. 2A.

FIG. 2B is a timing chart of the serial data transmitting circuit 9. Waveforms $D_{in0}$ to $D_{in3}$ illustrated in FIG. 2B represent waveforms of the digital signals $D_{in0}$ to $D_{in3}$ (illustrated in FIG. 2A) input in parallel. A waveform A illustrated in FIG. 2B represents a waveform of the clock signal CK illustrated in FIG. 2A. A waveform B illustrated in FIG. 2B represents a waveform of the first control signal $CNT_1$ illustrated in FIG. 2A. A waveform C illustrated in FIG. 2B represents a waveform of the second control signal $CNT_2$ illustrated in FIG. 2A. A waveform D illustrated in FIG. 2B represents a waveform of the digital signal output from the first 2:1 multiplexer 20 illustrated in FIG. 2A. A waveform E illustrated in FIG. 2B represents a waveform of the digital signal output from the second 2:1 multiplexer 21 illustrated in FIG. 2A. A waveform $V_{out}$ illustrated in FIG. 2B represents a waveform of the output analog signal $V_{out}$ illustrated in FIG. 2A.

The waveforms $D_{in0}$ to $D_{in3}$ have the same cycle as the waveform (represented by the waveform B) of the clock signal CK. The waveforms B and C are waveforms of signals with a frequency obtained by dividing the frequency of the clock signal CK by 2. The signal with the waveform C is delayed with respect to the signal with the waveform B, while the delay is equal to a half of the cycle of clock signal CK. Thus, a phase difference between the signals with the waveforms B and C is 90 degrees according to relationships between the delay difference between the signals with the waveforms B and C and the cycles of the digital signal waveforms $D_{in0}$ to $D_{in3}$. The cycles of the digital signal waveforms $D_{in0}$ to $D_{in3}$ are twice as long as the clock signal CK.

The waveform D represents a waveform formed by latching a digital signal corresponding to the first digital signal $D_{in0}$ at the times of falling edges of the waveform B, latching a digital signal corresponding to the third digital signal $D_{in2}$ at the times of rising edges of the waveform B, and selectively outputting any of the digital signals for each half cycle of the waveform B. Specifically, when the waveform B represents 0, the waveform D represents the signal corresponding to the first digital signal $D_{in0}$. When the waveform B represents 1, the waveform D represents the signal corresponding to the third digital signal $D_{in2}$.

The waveform E represents a waveform formed by latching a digital signal corresponding to the second digital signal $D_{in1}$ at the times of falling edges of the waveform C, latching a digital signal corresponding to the fourth digital signal $D_{in3}$ at the times of rising edges of the waveform C, and selectively outputting any of the digital signals for each half cycle of the waveform C. Specifically, when the waveform C represents 0, the waveform E represents the signal corresponding to the second digital signal $D_{in1}$. When the waveform C represents 1, the waveform E represents the signal corresponding to the fourth digital signal $D_{in3}$.

The output waveform $V_{out}$ represents a signal obtained by synthesizing the waveform D with the waveform E. Specifically, a waveform a included in the output waveform $V_{out}$ represents a signal obtained by synthesizing the signals corresponding to the first and second digital signals $D_{in0}$ and $D_{in1}$. A waveform b included in the output waveform $V_{out}$ represents a signal obtained by synthesizing the signals corresponding to the second and third digital signals $D_{in1}$ and $D_{in2}$. A waveform c included in the output waveform $V_{out}$ represents a signal obtained by synthesizing the signals corresponding to the third and fourth digital signals $D_{in2}$ and $D_{in3}$. A waveform d included in the output waveform $V_{out}$ represents a signal obtained by synthesizing the signals corresponding to the fourth and first digital signals $D_{in3}$ and $D_{in1}$. Thus, the output signal $V_{out}$ is a signal representing different values, which are a value when the waveform D and the waveform E both represent 0, a value when the waveform D and the waveform E represent 0 and 1 or 1 and 0, respectively, and a value when the waveform D and the waveform E both represent 1. Specifically, the output signal $V_{out}$ is a three-valued signal that has the three values.

In the aforementioned manner, the output signal $V_{out}$ is a serial signal to be transmitted at a data rate corresponding to a half of the cycle of the waveform A of the clock signal CK. Specifically, a unit interval (UI) of the serial data transmitting circuit 1 corresponds to a half of the cycle of the clock signal CK. Thus, the cycles of the first to fourth digital signals $D_{in0}$ to $D_{in3}$ input in parallel correspond to four UIs, while the cycle of the clock signal CK corresponds to two UIs.

In the serial data transmitting circuit 9, the first to second 2:1 multiplexers 20 and 21 are controlled by the first and second control signals $CNT_1$ and $CNT_2$ of which cycles are obtained by doubling the cycle of the clock signal CK by the ½ frequency divider 10. The first driver circuit 30 receives the signal output from the first 2:1 multiplexer 20. The second driver circuit 31 receives the signal output from the second 2:1 multiplexer 21. Thus, in the serial data transmitting circuit 9, an element that operates at intervals equal to the cycle of the clock signal CK is only the 1:2 frequency divider 10 surrounded by a broken line represented by an arrow B illustrated in FIG. 2A.

Figure 1A:
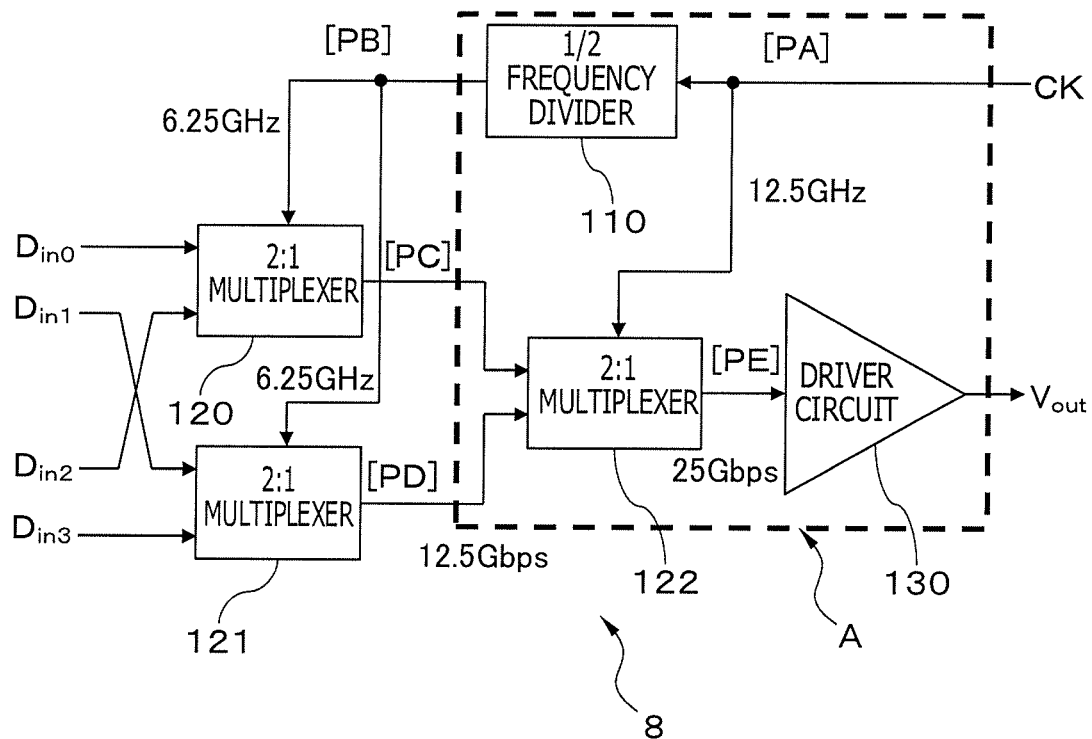
FIGS. 1A and 1B are diagrams illustrating and describing a conventional serial data transmitting circuit.
Figure 1B:
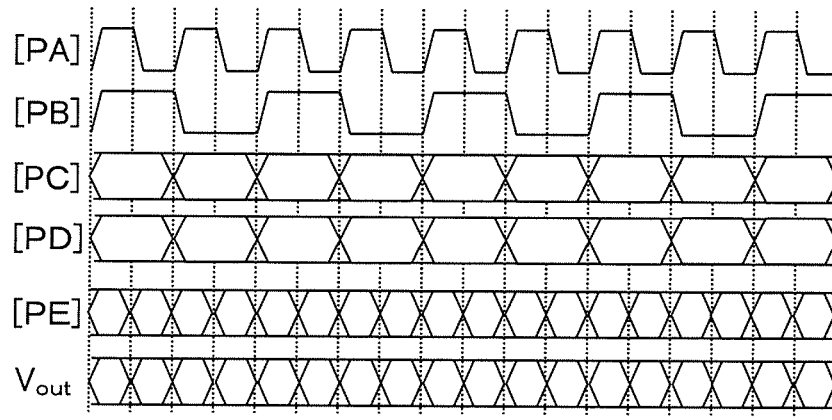

When the serial data transmitting circuit 9 is compared with the conventional serial data transmitting circuit 8 illustrated in FIG. 1A, one 2:1 multiplexer and one driver circuit are removed from among elements that operate at intervals equal to the cycle of the clock signal CK. Thus, the number of elements that are included in the serial data transmitting circuit 9 and operate at a high speed is reduced, compared with the conventional serial data transmitting circuit 8.

Since the serial data transmitting circuit 9 includes the two driver circuits 30 and 31, the number of driver circuits in the serial data transmitting circuit 9 is larger than the conventional serial data transmitting circuit 8 that includes the one driver circuit 130. However, there is no increase, caused by the increase in the number of driver circuits, in power to be consumed by the serial data transmitting circuit 9, compared with the conventional serial data transmitting circuit 8. Since the amplitudes of voltages $V_{out}$ output from the serial data transmitting circuits 8 and 9 are equal to each other, the serial data transmitting circuit 9 is designed so as to ensure that the total driving force of the two driver circuits 30 and 31 is equal to driving force of the one driver circuit 130. Thus, the total power to be consumed by the two driver circuit 30 and 31 is not different from power to be consumed by the one driver circuit 130.

A communication system that includes the serial data transmitting circuit 9 has a receiving circuit that has a function of receiving a three-valued signal. As described later in detail, as the receiving circuit that has the function of receiving a three-valued signal, there is a receiving circuit provided with a decision feedback equalizer that is a signal determining circuit for estimating a distortion of a signal waveform using decision feedback equalization (DFE). If the receiving circuit does not have the decision feedback equalizer (hereinafter referred to as DFE in some cases) in the communication system that includes the serial data transmitting circuit 9, the receiving circuit may not appropriately receive a signal transmitted by the serial data transmitting circuit 9.

Figure 6A:
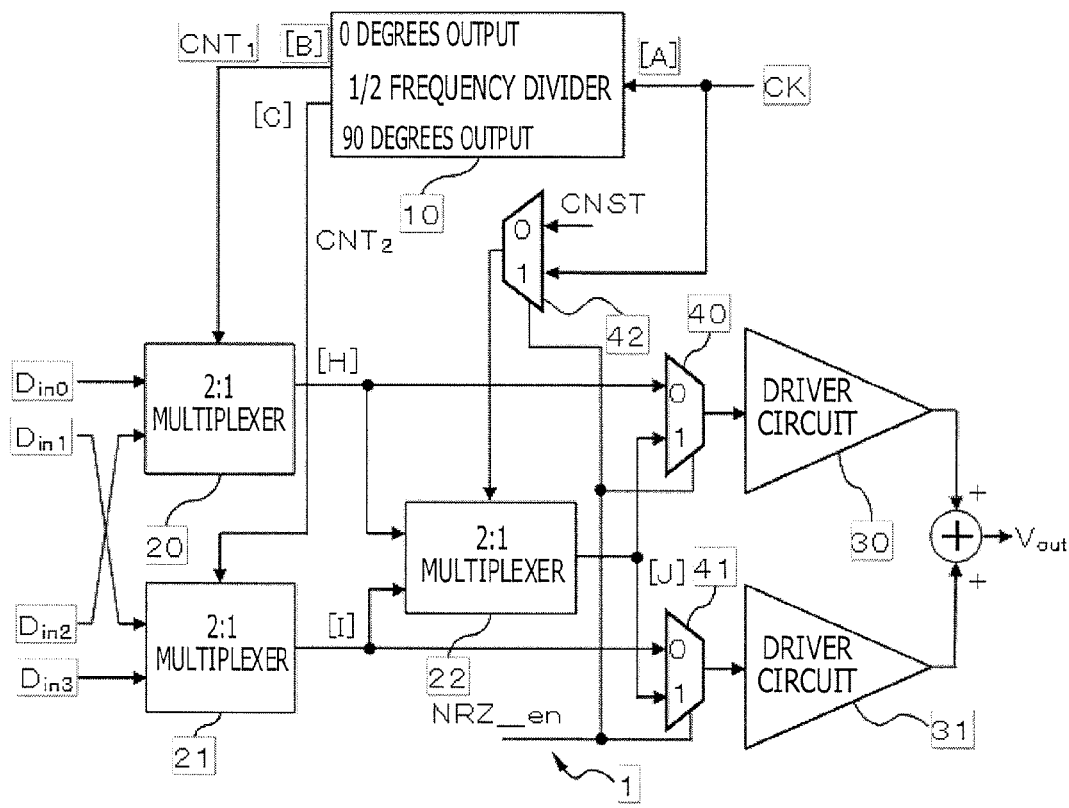
FIG. 6A is a circuit diagram illustrating an example of a serial data transmitting circuit.
Figure 6B:
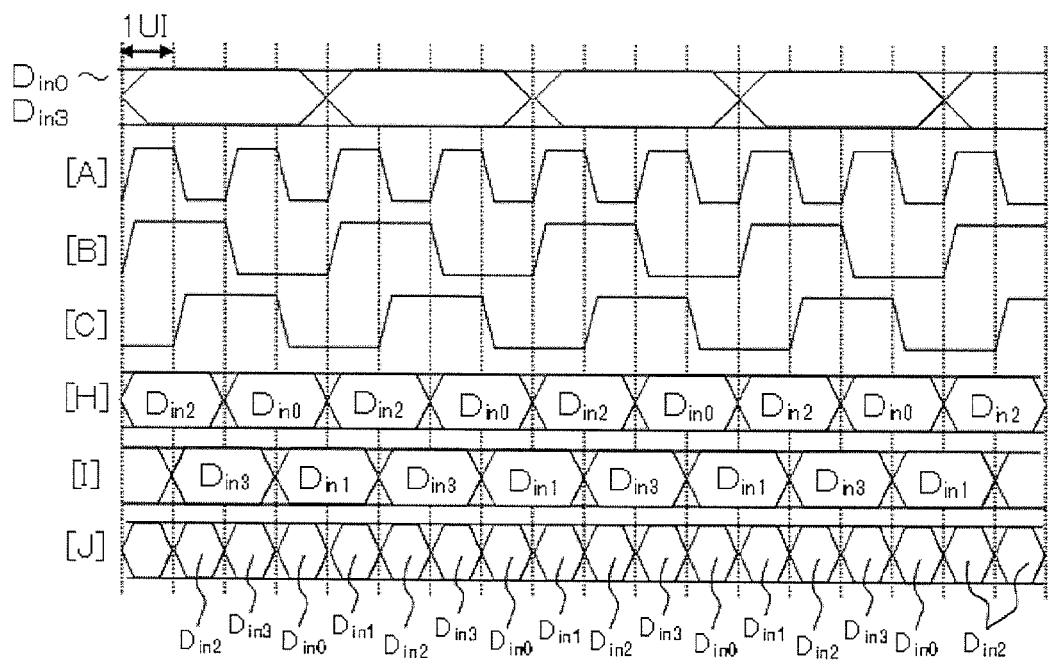
FIG. 6B is a timing chart of the serial data transmitting circuit illustrated in FIG. 6A.

FIG. 6A is a diagram illustrating an example of the serial data transmitting circuit. FIG. 6B is a timing chart of the serial data transmitting circuit illustrated in FIG. 6A.

The serial data transmitting circuit 1 is different from the related serial data transmitting circuit 9 described with reference to FIGS. 2A to 5, since the serial data transmitting circuit 1 includes a third 2:1 multiplexer 22 and first to third multiplexers 40 to 42.

The third 2:1 multiplexer 22 has the same configuration as the first 2:1 multiplexer 20 described with reference to FIG. 4. The first to third multiplexers 40 to 42 have the same configuration as the multiplexer 24 described with reference to FIG. 4.

The third 2:1 multiplexer 22 selectively outputs, based on a signal output from the third multiplexer 42, any of the signals output from the first and second 2:1 multiplexers 20 and 21 and input in parallel.

When an output selection signal NRZ_en represents 0, the first multiplexer 40 outputs a signal output from the first 2:1 multiplexer 20 and having a waveform H illustrated in FIG. 6B. When the output selection signal NRZ_en represents 1, the first multiplexer 40 outputs a signal output from the third 2:1 multiplexer 22 and having a waveform J illustrated in FIG. 6B.

When the output selection signal NRZ_en represents 0, the second multiplexer 41 outputs a signal output from the second 2:1 multiplexer 21 and having a waveform I illustrated in FIG. 6B. When the output selection signal NRZ_en represents 1, the second multiplexer 41 outputs the signal output from the third 2:1 multiplexer 22 and having a waveform J illustrated in FIG. 6B.

When the output selection signal NRZ_en represents 0, the third multiplexer 42 outputs a signal CNST that represents 1 or 0. When the output selection signal NRZ_en represents 1, the third multiplexer 42 outputs the clock signal CK.

When the output selection signal NRZ_en represents 0, the serial data transmitting circuit 1 functions as the same transmitting circuit as the serial data transmitting circuit 9 illustrated in FIG. 2A and outputs a three-valued signal. On the other hand, when the output selection signal NRZ_en represents 1, the serial data transmitting circuit 1 functions as the same transmitting circuit as the serial data transmitting circuit 8 illustrated in FIG. 1A and outputs an NRZ signal.

Figure 7:
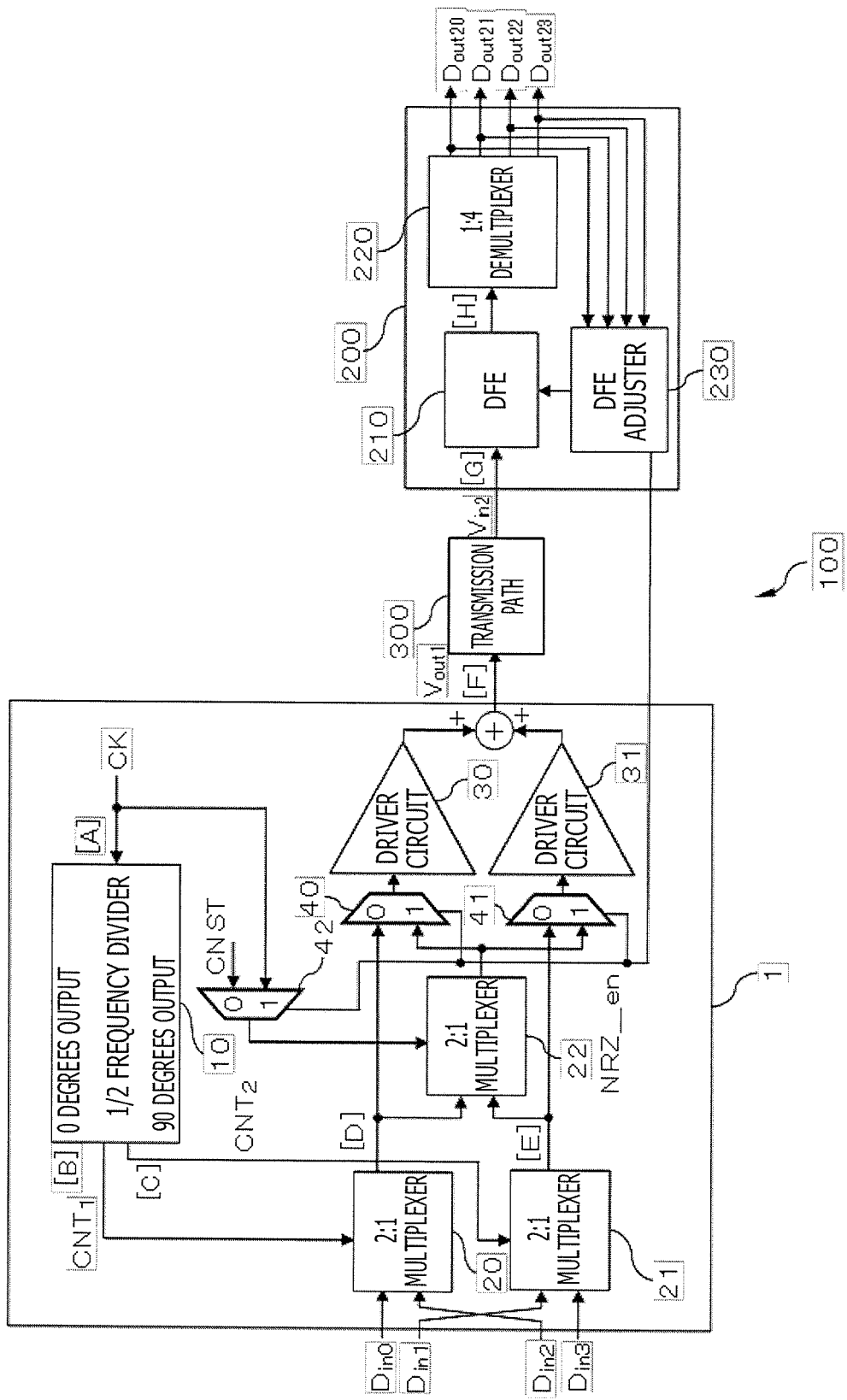
FIG. 7 is a circuit block diagram illustrating an example of a communication system that includes the serial data transmitting circuit illustrated in FIG. 6A.

FIG. 7 is a diagram illustrating an example of the communication system.

A communication system 100 includes the serial data transmitting circuit 1, a serial signal receiving circuit 200, and a transmission path 300. An output terminal of the serial data transmitting circuit 1 is connected to one of ends of the transmission path 300, while an input terminal of the serial signal receiving circuit 200 is connected to the other end of the transmission path 300. The first to fourth digital signals $D_{in0}$ to $D_{in3}$ input to the serial data transmitting circuit 1 in parallel are output as first to fourth signals $D_{out0}$ to $D_{out3}$ from the serial signal receiving circuit 200 through the transmission path 300. The transmission path 300 is a wiring that electrically connects the serial data transmitting circuit 1 to the serial signal receiving circuit 200.

Figure 8A:
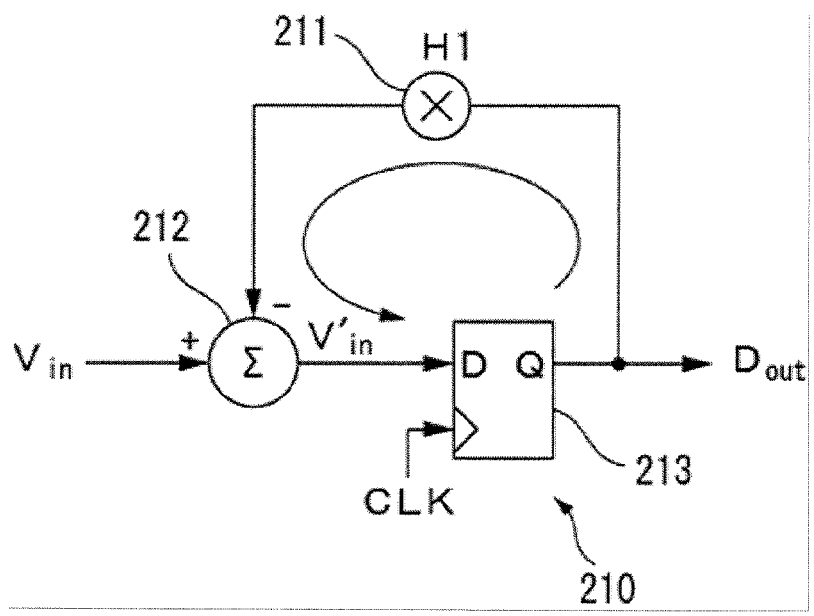
FIG. 8A is an internal circuit diagram illustrating a DFE of a serial data receiving circuit illustrated in FIG. 7.
Figure 8B:
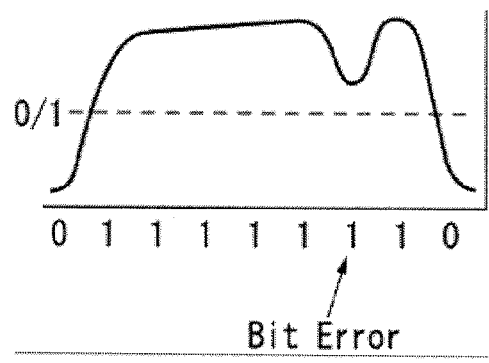
FIGS. 8B and 8C are timing charts related to the DFE of a serial data receiving circuit illustrated in FIG. 7.
Figure 8C:
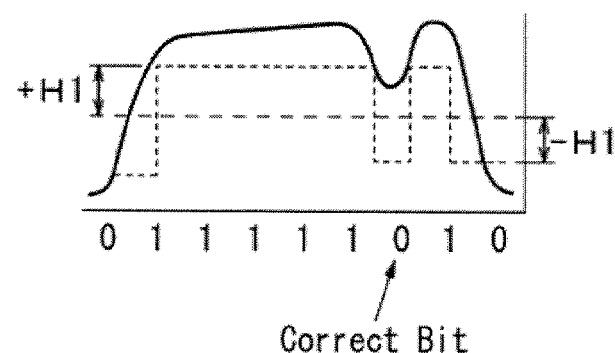

FIG. 8A is an internal circuit diagram illustrating a DFE 210 of the serial signal receiving circuit 200. FIGS. 8B and 8C are timing charts related to the DFE 210.

The serial signal receiving circuit 200 includes the DFE 210 and a 1:4 demultiplexer 220. The DFE 210 is a signal determining circuit that uses decision feedback equalization to estimate a distortion of a signal waveform. The DFE 210 includes a determining circuit 211, a subtracting circuit 212, and a D flip-flop 213.

The determining circuit 211 outputs a coefficient H1 or an opposite number −H1 of the coefficient H1 based on a result of determination of a signal previously input. The coefficient H1 is a positive number. If the determining circuit 211 determines that the signal previously input represents 0, the determining circuit 211 outputs the opposite number −H1. If the determining circuit 211 determines that the signal previously input represents 1, the determining circuit 211 outputs the coefficient H1.

The subtracting circuit 212 subtracts the signal output from the determining circuit 211 from an input signal $V_{in}$. If the determining circuit 211 determines that the signal previously input represents 0, the subtracting circuit 212 adds the coefficient H1 to the input signal $V_{in}$. If the determining circuit 211 determines that the signal previously input represents 1, the determining circuit 211 subtracts the coefficient H1 from the input signal $V_{in}$. A signal $V'_{in}$ obtained by subtracting the coefficient H1 or the opposite number −H1 from the input signal $V_{in}$ by the subtracting circuit 212 is input to an input terminal D of the D flip flop 213. The D flip flop 213 outputs, from an output terminal Q, a digital signal $D_{out}$ that represents 0 or 1 at the times of rising or falling edges of a clock signal CLK. In this manner, the DFE 210 may adjust, based on a result of determination of a signal previously input, a threshold for determination of a signal of a next cycle, thereby correct a distortion of a waveform, and determine the input signal as a digital signal representing 0 or 1.

The DFE 210 subtracts the coefficient H1 or the opposite number −H1 from the input signal $V_{in}$ instead of the adjustment of the threshold and thereby has a configuration equivalent with a configuration for changing the threshold. FIG. 8B is a timing chart of an example of results of determination by a circuit that does not have a decision feedback equalization function, while FIG. 8C is a timing chart of results of determination by the DFE 210. In FIG. 8B, an arrow "Bit Error" represents a bit that is normally determined to be 0, but is erroneously determined before transition to the threshold due to the previously input signal representing 0 and a high-speed operation. In FIG. 8C, a bit represented by an arrow "Correct Bit" is appropriately determined by the DFE 210 that has an effect equivalent with an effect of changing the threshold.

If a transmission loss in the transmission path 300 is 0, an amplitude corresponding to the coefficient H1 of the DFE 210 is set to a value that is approximately a half of the amplitude of the signal $V_{in}$ input to the DFE 210. Since a transmission loss actually occurs in the transmission path, the coefficient H1 is adjusted so as to ensure that the determining circuit appropriately determines that the signal represents 0 or 1.

Figure 9:
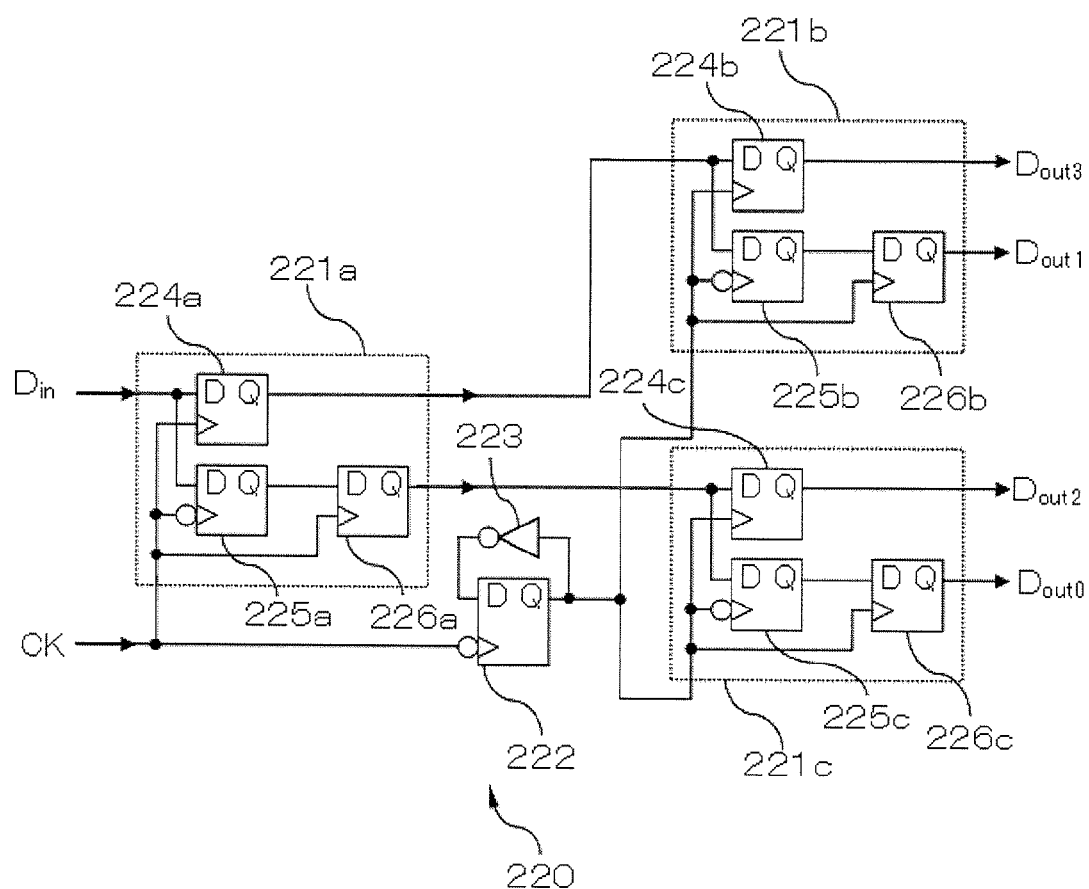
FIG. 9 is an internal circuit diagram illustrating a 1:4 demultiplexer of the serial data receiving circuit illustrated in FIG. 7.

FIG. 9 is a diagram illustrating an example of the 1:4 demultiplexer 220. The 1:4 demultiplexer 220 includes 1:2 demultiplexers 221a, 221b, and 221c, a D flip-flop 222, and an inverter 223. The 1:2 demultiplexer 221a includes D flip-flops 224a, 225a, and 226a. A digital signal $D_{in}$ in a serial format and a clock signal CK are input to the 1:2 demultiplexer 221a. The D flip-flop 224a latches the digital signal $D_{in}$ input to an input terminal $D_{in}$ of the D flip-flop 224a at the times of the rising edges of the clock signal CK. The D flip-flop 225a latches the digital signal $D_{in}$ input to an input terminal $D_{in}$ of the D flip-flop 225a at the times of the falling edges of the clock signal CK. The D flip-flop 226a latches a signal output from the D flip-flop 225a and input to an input terminal D of the D flip-flop 226a at the times of the rising edges of the clock signal CK.

The 1:2 demultiplexers 221b and 221c have the same circuit configuration as the 1:2 demultiplexer 221a. The D flip-flop 222 and the inverter 223 each generate, at the times of the falling edges of the clock signal CK, a signal with a frequency obtained by dividing the frequency of the clock signal CK by 2.

The D flip-flop 224b latches a signal output from the D flip-flop 224a at the times of the rising edges of the clock signal CK with the frequency divided by 2 and outputs the signal as a fourth digital signal $D_{out3}$ from an output terminal Q. The D flip-flop 225b latches the signal output from the D flip-flop 224a at the times of the falling edges of the clock signal CK with the frequency divided by 2 and outputs the signal from an output terminal Q. The D flip-flop 226b latches the signal output from the D flip-flop 225b and input to an input terminal D of the D flip-flop 226b at the times of the rising edges of the clock signal CK with the frequency divided by 2 and outputs the signal as the second digital signal $D_{out1}$ from an output terminal Q.

The D flip-flop 224c latches the signal output from the D flip-flop 226a at the times of the rising edges of the clock signal CK with the frequency divided by 2 and outputs the signal as the third digital signal $D_{out2}$ from an output terminal Q. The D flip-flop 225c latches the signal output from the D flip-flop 226a at the times of the falling edges of the clock signal CK with the frequency divided by 2 and outputs the signal from an output terminal Q. The D flip-flop 226c latches the signal output from the D flip-flop 225c and input to an input terminal D of the D flip-flop 226c at the times of the rising edges of the clock signal CK with the frequency divided by 2 and outputs the signal as the first digital signal $D_{out0}$ from an output terminal Q.

Since the 1:4 demultiplexer 220 has the aforementioned configuration, the 1:4 demultiplexer 220 outputs the digital signal $D_{in}$ input in the serial format as the first to fourth digital signals $D_{out0}$ to $D_{out3}$ in parallel.

Next, operations of the communication system 100 when the output selection signal NRZ_en is set to 0 and the serial data transmitting circuit 1 transmits a three-valued signal are described with reference to FIG. 10.

Figure 10:
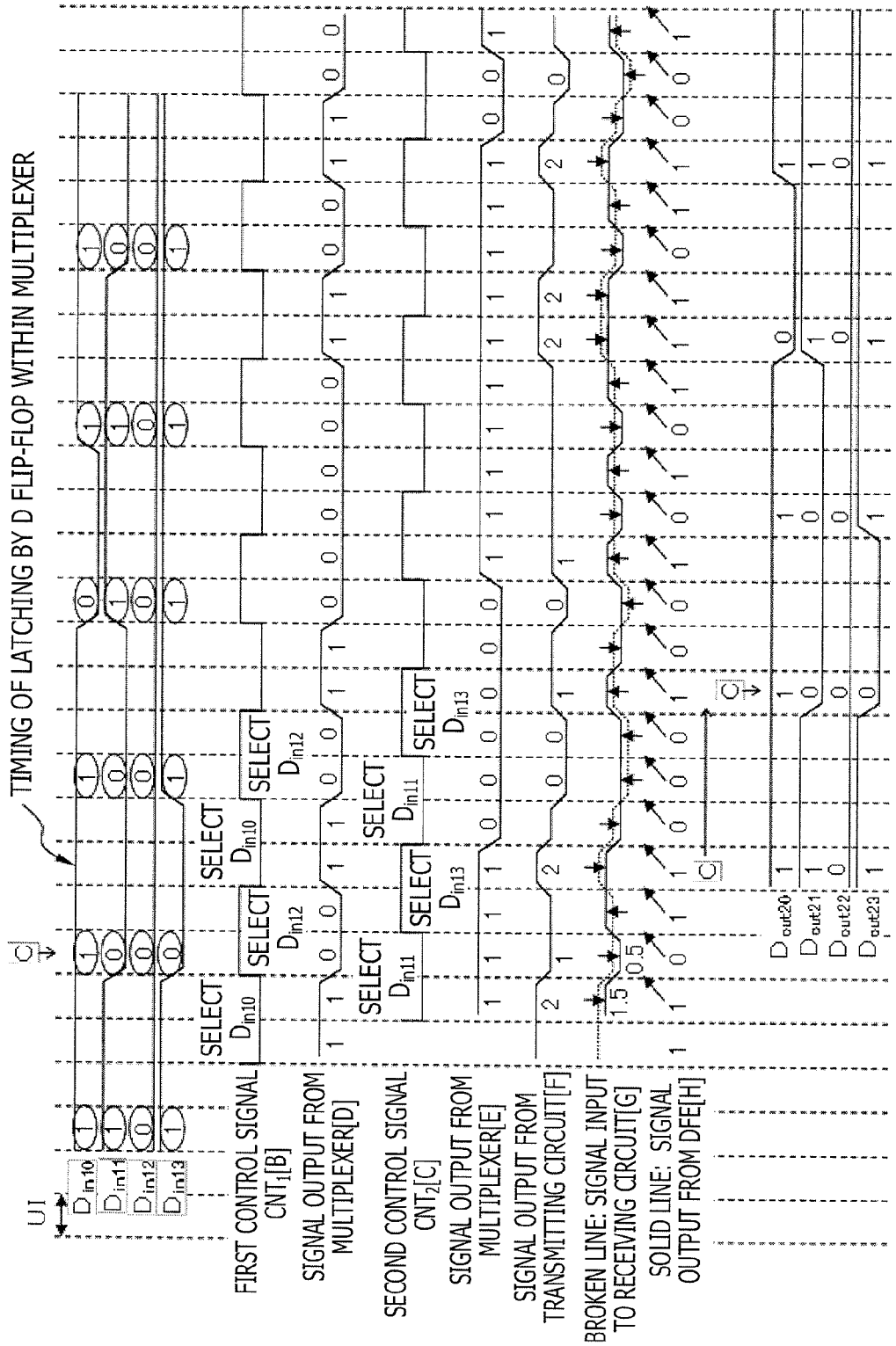
FIG. 10 is a timing chart of the communication system illustrated in FIG. 7.

FIG. 10 is a timing chart of the communication system 100 when the output selection signal NRZ_en is set to 0.

First to fourth digital signals $D_{in10}$ to $D_{in13}$ are input in parallel at intervals of 4 UIs. The first digital signals $D_{in10}$ to $D_{in13}$ input in parallel represent 1101. The second digital signals $D_{in10}$ to $D_{in13}$ input in parallel represent 1000. Ellipses represented in the waveforms of the first to fourth digital signals $D_{in10}$ to $D_{in13}$ represent times when the first to fourth digital signals $D_{in10}$ to $D_{in13}$ are latched by the D flip-flops. The first and third digital signals $D_{in10}$ to $D_{in12}$ are latched by the D flip-flops included in the first 2:1 multiplexer 20, while the second and fourth digital signals $D_{in11}$ to $D_{in13}$ are latched by the D flip-flops included in the second 2:1 multiplexer 21.

Waveforms B and D represent selection states of the digital signals $D_{in10}$ and $D_{in12}$ in the first 2:1 multiplexer 20. The waveform B is a waveform of the first control signal $CNT_1$ input to the first 2:1 multiplexer 20. The waveform D is a waveform of a signal output from the first 2:1 multiplexer 20 based on the first control signal $CNT_1$. When the waveform B represents 0, the first digital signal $D_{in10}$ is selected in the first 2:1 multiplexer 20 and output as a signal with the waveform D. When the waveform B represents 1, the third digital signal $D_{in12}$ is selected in the first 2:1 multiplexer 20 and output as the signal with the waveform D.

Waveforms C and E represent selection states of the digital signals $D_{in11}$ and $D_{in13}$ in the second 2:1 multiplexer 21. The waveform C is a waveform of the second control signal $CNT_2$ input to the second 2:1 multiplexer 21. The waveform E is a waveform of a signal output from the second 2:1 multiplexer 21 based on the second control signal $CNT_2$. When the waveform C represents 0, the second digital signal $D_{in11}$ is selected in the second 2:1 multiplexer 21 and output as a signal with the waveform E. When the waveform C represents 1, the fourth digital signal $D_{in13}$ is selected in the second 2:1 multiplexer 21 and output as the signal with the waveform E.

A waveform F is a waveform of an analog signal $V_{out1}$ obtained by synthesizing signals output from the first and second driver circuits 30 and 31 to which digital signals output from the first and second 2:1 multiplexers 20 and 21 are input. A first signal with the waveform F is a signal obtained by synthesizing a signal corresponding to the first digital signal $D_{in10}$ with a signal corresponding to the second digital signal $D_{in11}$ and has a value of 2. A second signal with the waveform F is a signal obtained by synthesizing a signal corresponding to the second digital signal $D_{in11}$ with a signal corresponding to the third digital signal $D_{in12}$ and has a value of 1. A third signal with the waveform F is a signal obtained by synthesizing a signal corresponding to the third digital signal $D_{in12}$ with a signal corresponding to the fourth digital signal $D_{in13}$ and has a value of 1. A fourth signal with the waveform W is a signal obtained by synthesizing a signal corresponding to the fourth digital signal $D_{in13}$ with a signal corresponding to the first digital signal $D_{in10}$ and has a value of 2.

A waveform G represented by a broken line is a waveform of a signal received by the serial signal receiving circuit 200. It is assumed that a delay caused by the transmission path 300 is not considered and a signal is not attenuated in the transmission path 300. Thus, the waveform G has the same shape as the waveform F. A waveform illustrated near the waveform G is a waveform of a signal input to the input terminal of the D flip-flop 213 of the DFE 210. For example, a first signal with the waveform that is input to the input terminal D of the D flip-flop 213 represents 1.5 that is obtained by subtracting the coefficient H1 of 0.5 from 2 that is a value of the waveform G. This is due to the fact that the determining circuit 211 determines that the signal previously input represents 1. A second signal with the waveform that is input to the input terminal D of the D flip-flop 213 represents 0.5 that is obtained by subtracting the coefficient H1 of 0.5 from 1 that is a value of the waveform G. This is due to the fact that the determining circuit 211 determines that the signal previously input represents 1. On the other hand, a third signal with the waveform that is input to the input terminal D of the D flip-flop 213 represents 1.5 that is obtained by adding the coefficient H1 of 0.5 to 1 that is the value of the waveform G. This is due to the fact that the determining circuit 211 determines that the signal previously input represents 0.

A table 1 represents relationships between the value of the signal $V_{in}$ input to the DFE 210, a determined value of a signal $D_{out}$ previously output, and the value of the signal $V'_{in}$ input to the D flip-flop 213. The threshold of the D flip-flop 213 is "1".

TABLE 1

| | | Signal $V'_{in}$ input to D flip-flop 213 | | |
|---|---|---|---|---|
| | | | Input signal $V_{in}$ | |
| | | 0 | 1 | 2 |
| Signal $D_{out}$ | 0 | 0 | 0.5 | 1.5 | — |
| | 1 | — | 0.5 | 1.5 |

Data represented by an arrow C illustrated in FIG. 10 is the second digital signals input to the communication system 100 in parallel. The first to fourth digital signals $D_{in10}$ to $D_{in13}$ input in parallel and representing 1000 are output as the first to fourth digital signals $D_{out20}$ to $D_{out23}$ representing 1000 through a digital signal output in a serial format from the DFE 210.

When the output selection signal NRZ_en is set to 0 and the serial data transmitting circuit 1 transmits a three-valued signal, the communication system 100 processes the NRZ signal in the same manner as a conventional communication system.

The DFE adjuster 230 includes a calculator, a storage unit, and a pattern checker. The DFE adjuster 230 transmits the output selection signal NRZ_en to the serial data transmitting circuit 1 and determines whether the serial data transmitting circuit 1 transmits the three-valued signal or the NRZ signal. In addition, when the serial data transmitting circuit 1 transmits the NRZ signal, the DFE adjuster 230 determines the coefficient H1 of the DFE 210.

Figure 11:
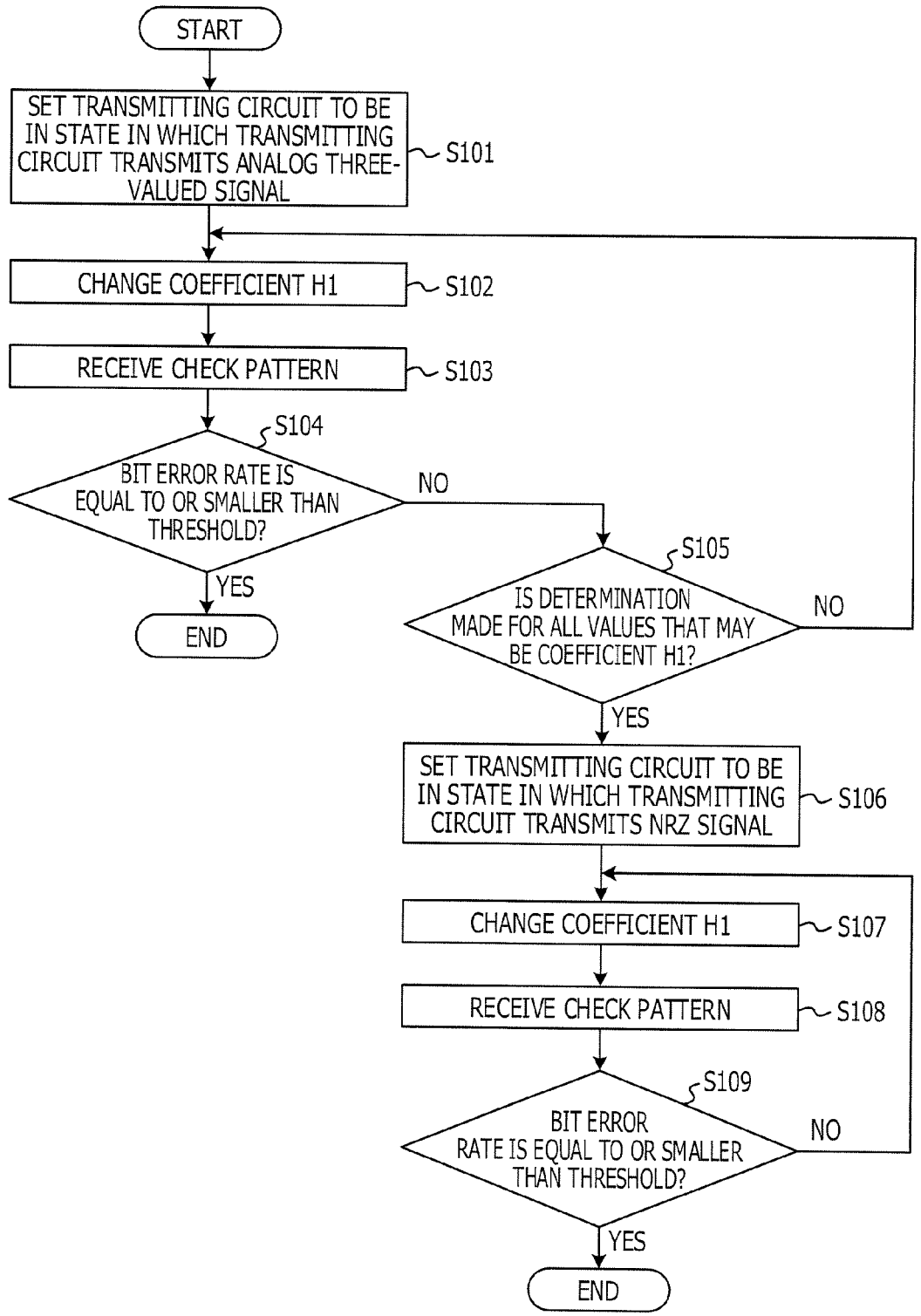
FIG. 11 is a flowchart of a process that is executed by a DFE adjuster of the serial data receiving circuit illustrated in FIG. 7.

FIG. 11 is a diagram illustrating the flow of a process that is executed by the DFE adjuster 230.

In step S101, the DFE adjuster 230 transmits, as the output selection signal NRZ_en, a signal representing 0 to the serial data transmitting circuit 1 and sets the serial data transmitting circuit 1 to be in a state in which the serial data transmitting circuit 1 transmits the three-valued signal. In step S102, the DFE adjuster 230 changes the coefficient H of the DFE 210.

In step S103, the DFE adjuster 230 receives a predetermined check pattern from the serial data transmitting circuit 1. In step S104, the DFE adjuster 230 uses the pattern checker to compare the check pattern received from the serial data transmitting circuit 1 through the DFE 210 and the 1:4 demultiplexer 220 with a check pattern stored in the storage unit. Then, in step S104, the DFE adjuster 230 determines whether or not a bit error rate determined based on a result of the determination is equal to or smaller than a predetermined threshold.

If the DFE adjuster 230 determines that the bit error rate is equal to or smaller than the predetermined threshold in step S104, the DFE adjuster 230 determines that the serial signal receiving circuit 200 is able to receive the three-valued signal from the serial data transmitting circuit 1, and the DFE adjuster 230 terminates the process. If the adjuster 230 determines that the bit error rate is larger than the predetermined threshold in step S104, the process proceeds to step S105 and returns to S102. If the coefficient H1 is any value and the DFE adjuster 230 determines that the bit error rate is larger than the predetermined threshold in step S105, the process proceeds to step S106.

In step S106, the DFE adjuster 230 transmits, as the output selection signal NRZ_en, a signal representing 1 to the serial data transmitting circuit 1 and sets the serial data transmitting circuit 1 to be in a state in which the serial data transmitting circuit 1 transmits the NRZ signal.

In step S107, the DFE adjuster 230 changes the coefficient H1 of the DFE 210. In step S108, the DFE adjuster 230 receives a check pattern from the serial data transmitting circuit 1 in the same manner as step S102. In step S109, the DFE adjuster 230 determines whether or not the bit error rate is equal to or smaller than the predetermined threshold in the same manner as step S103.

If the DFE adjuster 230 determines that the bit error rate is equal to or smaller than the predetermined threshold in step S109, the DFE adjuster 230 determines that the serial signal receiving circuit 200 is able to receive the NRZ signal from the serial data transmitting circuit 1, and the DFE adjuster 230 terminates the process. On the other hand, if the DFE adjuster 230 determines that the bit error rate is larger than the predetermined threshold in step S109, the process returns to step S107. Then, the DFE adjuster 230 repeats the processes of steps S107 to S109 until the bit error rate becomes equal to or smaller than the predetermined threshold.

The communication system 100 is described above with reference to FIGS. 7 to 11. In the communication system 100, the signal output as the three-valued signal from the serial data transmitting circuit 1 is received by the serial signal receiving circuit 200 that includes the DFE 210. In addition, if the DFE adjuster 230 determines that the serial signal receiving circuit 200 is not able to receive the three-valued signal, the serial data transmitting circuit 1 outputs the NRZ signal instead of the three-valued signal. Thus, the serial data transmitting circuit 1 is compatible with a serial data transmitting circuit included in a communication system that includes a receiving circuit that does not include a DFE or does not appropriately receive a three-valued signal. The serial data transmitting circuit 1 may be replaced with another serial data transmitting circuit.

Figure 12:
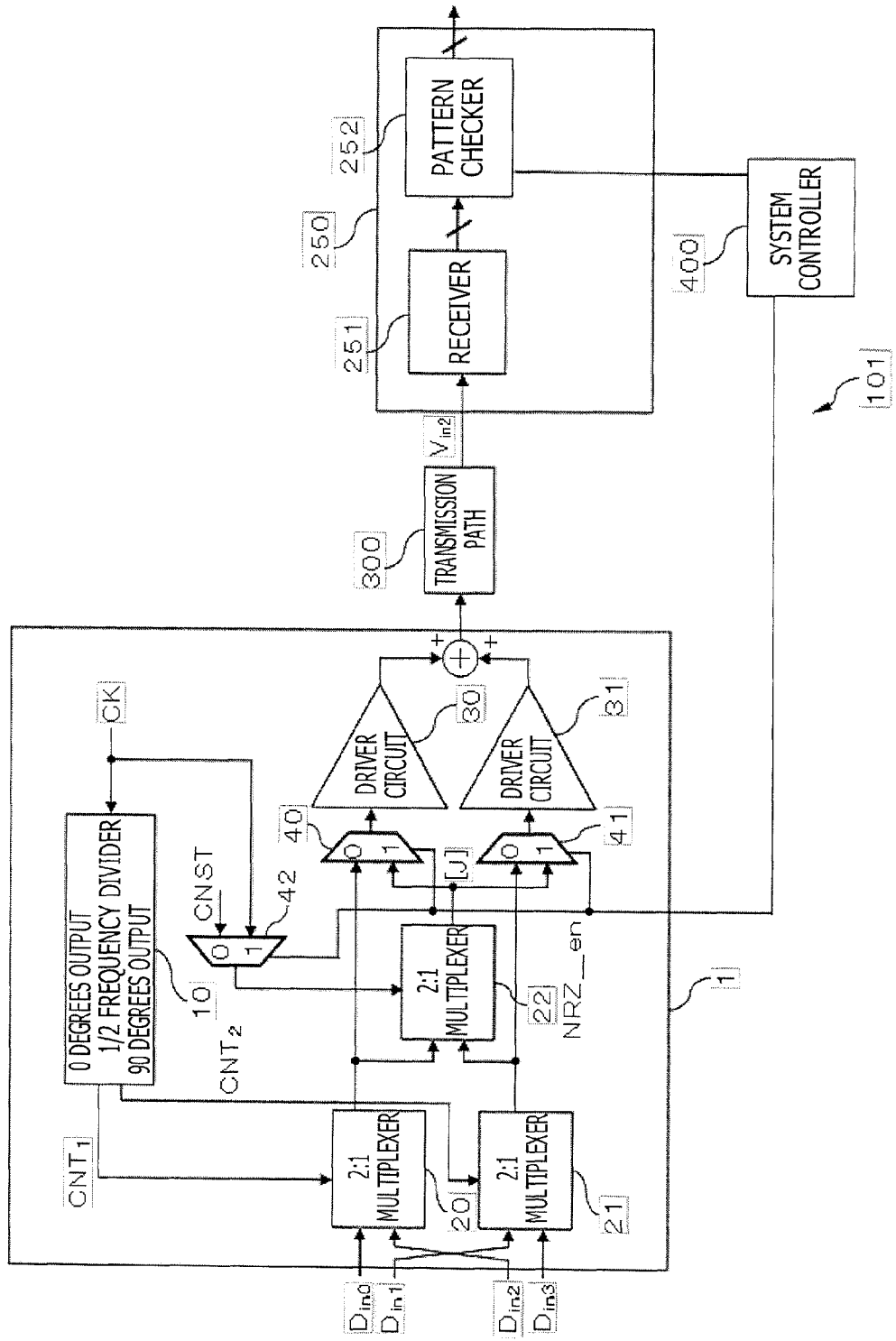
FIG. 12 is a circuit block diagram illustrating another example of the communication system that includes the serial data transmitting circuit illustrated in FIG. 6.

FIG. 12 is a diagram illustrating another example of the communication system.

A communication system 101 is different from the communication system 100, since the communication system 101 includes a serial signal receiving circuit 250 that includes a receiver 251 and a pattern checker 252 instead of the serial signal receiving circuit 200. The communication system 101 further includes a system controller 400.

In the communication system 101, the system controller 400 that is located at a higher level than the serial data transmitting circuit 1 and the serial signal receiving circuit 250 determines whether the serial data transmitting circuit 1 transmits the three-valued signal or the NRZ signal.

The system controller 400 determines, based on a pattern check result received from the serial signal receiving circuit 250, whether the serial data transmitting circuit 1 transmits the three-valued signal or the NRZ signal. When the system controller 400 sets the serial data transmitting circuit 1 to be in the state in which the serial data transmitting circuit 1 transmits the three-valued signal, and the bit error rate is large, the system controller 400 switches the state of the serial data transmitting circuit 1 to the state in which that the serial data transmitting circuit 1 transmits the NRZ signal. For example, if the receiver 251 of the serial signal receiving circuit 250 does not include a DFE, the bit error rate detected by the pattern checker 252 is very large and the system controller 400 determines that the serial signal receiving circuit 250 does not appropriately receive a signal.

Hereinafter, another embodiment is described. Although the serial data transmitting circuit 1 is described as a circuit for supplying a serial signal to the transmission path 300, the serial data transmitting circuit 1 may be used as a signal synthesizing circuit for outputting a serial signal obtained by synthesizing digital signals input in parallel. In addition, the number of digital signals input in parallel is not limited to the number of the digital signals described above, and a desired number of digital signals, such as 16 or 32 digital signals, may be input in parallel to the serial data transmitting circuit 1.

In addition, a phase difference between the digital signals to be input to the serial data transmitting circuit 1 is not limited to the phase difference described above. The desired phase difference between the digital signals to be input to the serial data transmitting circuit 1 may be a desired phase difference as long as the serial signal receiving circuits 200 and 250 included in the communication systems 100 and 101 decode the signals.

Although the communication systems 100 and 101 detect the bit error rates of the serial signal receiving circuits 200 and 250 and each determine a value of the selection signal NRZ_en, the selection signal NRZ_en may be input from the outside of the communication systems 100 and 101.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting circuit comprising:
    a multiplexer configured to output a third digital signal obtained by alternately synthesizing a first digital signal of a predetermined cycle length and a predetermined data rate with a second digital signal, shifted by a half of the predetermined cycle length from the first digital signal, of the predetermined cycle length and the predetermined data rate so as to ensure that a data rate of the third digital signal is twice as high as the data rate of the first digital signal;
    a first selector configured to output the first digital signal in a first state and output the third digital signal in a second state that is different from the first state;
    a second selector configured to output the second digital signal in the first state and output the third digital signal in the second state;
    a first driver circuit configured to output a signal corresponding to a signal output from the first selector;
    a second driver circuit coupled to the first driver through outputs of the first and second driver circuits and configured to output a signal corresponding to a signal output from the second selector, and
    a third selector configured to supply a constant signal that represents 1 or 0 to the multiplexer in the first state, and supply a clock signal to the multiplexer in the second state,
    wherein the multiplexer stops outputting the third digital signal when the constant signal is supplied to the multiplexer.

2. The transmitting circuit according to claim 1, further comprising
    a selection signal terminal configured to receive a signal to select the first state or the second state.

3. A communication system comprising:
    a transmitting circuit;
    a transmission path of which an end is coupled to an output unit of the transmitting circuit; and
    a receiving circuit coupled to another end of the transmission path,
    wherein the transmitting circuit includes
        a multiplexer configured to output a third digital signal obtained by alternately synthesizing a first digital signal of a predetermined cycle length and a predetermined data rate with a second digital signal, shifted by a half of the predetermined cycle length from the first digital signal, of the predetermined cycle length and the predetermined data rate so as to ensure that a data rate of the third digital signal is twice as high as the data rate of the first digital signal,
        a first selector configured to output the first digital signal in a first state and output the third digital signal in a second state that is different from the first state,
        a second selector configured to output the second digital signal in the first state and output the third digital signal in the second state,
        a first driver circuit configured to output a signal corresponding to a signal output from the first selector,
        a second driver circuit coupled to the first driver through outputs of the first and second driver circuits and configured to output a signal corresponding to a signal output from the second selector, and
        a third selector configured to supply a constant signal that represents 1 or 0 to the multiplexer in the first state, and supply a clock signal to the multiplexer in the second state,
    wherein the multiplexer stops outputting the third digital signal when the constant signal is supplied to the multiplexer.

4. The communication system according to claim 3, wherein the transmitting circuit further includes a selection signal terminal configured to receive a signal to select the first state or the second state.

5. The communication system according to claim 4, wherein if the receiving circuit includes a decision feedback equalizer, a signal to select the first state is input to the selection signal terminal, and
wherein if the receiving circuit does not include a decision feedback equalizer, a signal to select the second state is input to the selection signal terminal.

* * * * *